United States Patent
Wen et al.

(10) Patent No.: US 11,165,450 B2
(45) Date of Patent: Nov. 2, 2021

(54) CONTROL METHOD AND WIRELESS MODULE APPLIED TO WIRELESS DEVICE

(71) Applicant: MEDIATEK INC., Hsin-Chu (TW)

(72) Inventors: Yu-Ming Wen, Hsinchu (TW);
Juei-Ting Sun, Hsin-Chu (TW);
Po-Hsun Huang, Hsin-Chu (TW);
En-Chieh Hsia, Hsin-Chu (TW);
Chang-Yi Hsu, Hsin-Chu (TW);
Che-Wei Huang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/727,942

(22) Filed: Dec. 27, 2019

(65) Prior Publication Data
US 2020/0313702 A1    Oct. 1, 2020

Related U.S. Application Data

(60) Provisional application No. 62/823,057, filed on Mar. 25, 2019.

(51) Int. Cl.
*H04B 1/04*        (2006.01)
*H04W 52/38*     (2009.01)

(52) U.S. Cl.
CPC .............. *H04B 1/04* (2013.01); *H04W 52/38* (2013.01); *H04B 2001/0408* (2013.01)

(58) Field of Classification Search
CPC .............. H04B 1/04; H04B 2001/0408; H04B 2001/0416; H04B 1/10; H04W 52/38; H03G 3/20
See application file for complete search history.

(56) References Cited

U.S. PATENT DOCUMENTS

| 10,098,136 B1 | 10/2018 | Jorgovanovic |
| 2009/0033550 A1 | 2/2009 | Wolf |
| 2010/0151898 A1 | 6/2010 | Lee |
| 2011/0312288 A1 | 12/2011 | Fu |
| 2012/0258759 A1* | 10/2012 | Smadi ............... H04W 52/52 455/522 |
| 2013/0324049 A1* | 12/2013 | Mujtaba ............ G01N 21/3504 455/63.1 |

(Continued)

FOREIGN PATENT DOCUMENTS

| CN | 103037493 A | 4/2013 |
| CN | 107453762 A | 12/2017 |
| TW | 201832483 A | 9/2018 |

*Primary Examiner* — Nguyen T Vo
(74) *Attorney, Agent, or Firm* — Winston Hsu

(57) ABSTRACT

The present invention provides a wireless module applied to a wireless device, wherein the wireless module comprises a receiver, a transmitter and a control circuit. The receiver is configured to receive a receiving signal from an electronic device external to the wireless device, the transmitter is configured to transmit a transmitting signal, and the control circuit is configured to control a gain of the receiver and controlling a gain of the transmitter. In the operations of the wireless module, the controller refers to transmitter time information and a gain of a transmitter within another wireless module to determine an upper limit of the gain of the receiver, and/or the controller refers to receiver time information and a gain of a receiver within the another wireless module to determine an upper limit of the gain of the transmitter.

14 Claims, 3 Drawing Sheets

(56) References Cited

U.S. PATENT DOCUMENTS

| | | | | |
|---|---|---|---|---|
| 2013/0344821 A1* | 12/2013 | Armstrong | ........ | H04W 72/1215 |
| | | | | 455/79 |
| 2014/0087663 A1* | 3/2014 | Burchill | .............. | H04W 52/243 |
| | | | | 455/41.2 |
| 2015/0110066 A1* | 4/2015 | Gaal | ..................... | H04W 16/14 |
| | | | | 370/330 |
| 2016/0336984 A1* | 11/2016 | Demay | ................... | H04W 4/80 |

* cited by examiner

CONTROL METHOD AND WIRELESS MODULE APPLIED TO WIRELESS DEVICE

CROSS REFERENCE TO RELATED APPLICATIONS

This application claims the priority of U.S. Provisional Application No. 62/823,057, filed on Mar. 25, 2019, which is included herein by reference in its entirety.

BACKGROUND

The current wireless device generally comprises at least two wireless modules such as Wi-Fi module and Bluetooth (BT) module. To avoid signal collision, the wireless modules may select non-overlapping channels and use frequency division duplex (FDD) method to transmit/receive data. In the FDD coexistence of the wireless modules, a transmitting signal of one wireless module will degrade a receiving signal of another wireless module, even if the wireless modules work on non-overlapping channels. To mitigate the performance degradation of the receiver, a power of the transmitting signal and a gain of the receiver may be designed lower. However, lowering the power of the transmitting signal will decrease a transmitting range, and lowering the gain of the receiver will degrade the sensitivity and cause a near-far issue. In addition, the transmitter-receiver (TX-RX) isolation becomes smaller in the current wireless device, and the smaller TX-RX isolation introduces worse signal-to-noise ratio (SNR) and the limits of the power of the transmitting signal and the gain of the receiver are designed lower.

SUMMARY

It is therefore an objective of the present invention to provide a control method and a circuit applied to the wireless device, which can align the timing of the transmitting signal of one wireless module to determine an upper limit of the gain of the receiver of another wireless module, or align the timing of the receiving signal of one wireless module to determine an upper limit of the gain of the transmitter of another wireless module, to solve the above-mentioned problems.

According to one embodiment of the present invention, a control method of a wireless device is provided, wherein the wireless device comprises a first wireless module and a second wireless module, and the control method comprises the steps of: obtaining transmitter time information that a transmitter of the first wireless module transmits a transmitting signal; and referring to the transmitter time information to determine an upper limit of a gain of a receiver of the second wireless module.

According to another embodiment of the present invention, a control method of a wireless device is provided, wherein the wireless device comprises a first wireless module and a second wireless module, and the control method comprises the steps of: obtaining receiver time information that a receiver of the first wireless module receives a receiving signal; and referring to the receiver time information to determine an upper limit of a power of a transmitting signal transmitted by a transmitter of the second wireless module.

According to another embodiment of the present invention, a wireless module applied to a wireless device is provided, and the wireless module comprises a receiver, a transmitter and a control circuit. The receiver is configured to receive a receiving signal from an electronic device external to the wireless device, the transmitter is configured to transmit a transmitting signal, and the control circuit is configured to control a gain of the receiver and controlling a gain of the transmitter. In the operations of the wireless module, the controller refers to transmitter time information and a gain of a transmitter within another wireless module to determine an upper limit of the gain of the receiver, and/or the controller refers to receiver time information and a gain of a receiver within the another wireless module to determine an upper limit of the gain of the transmitter.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
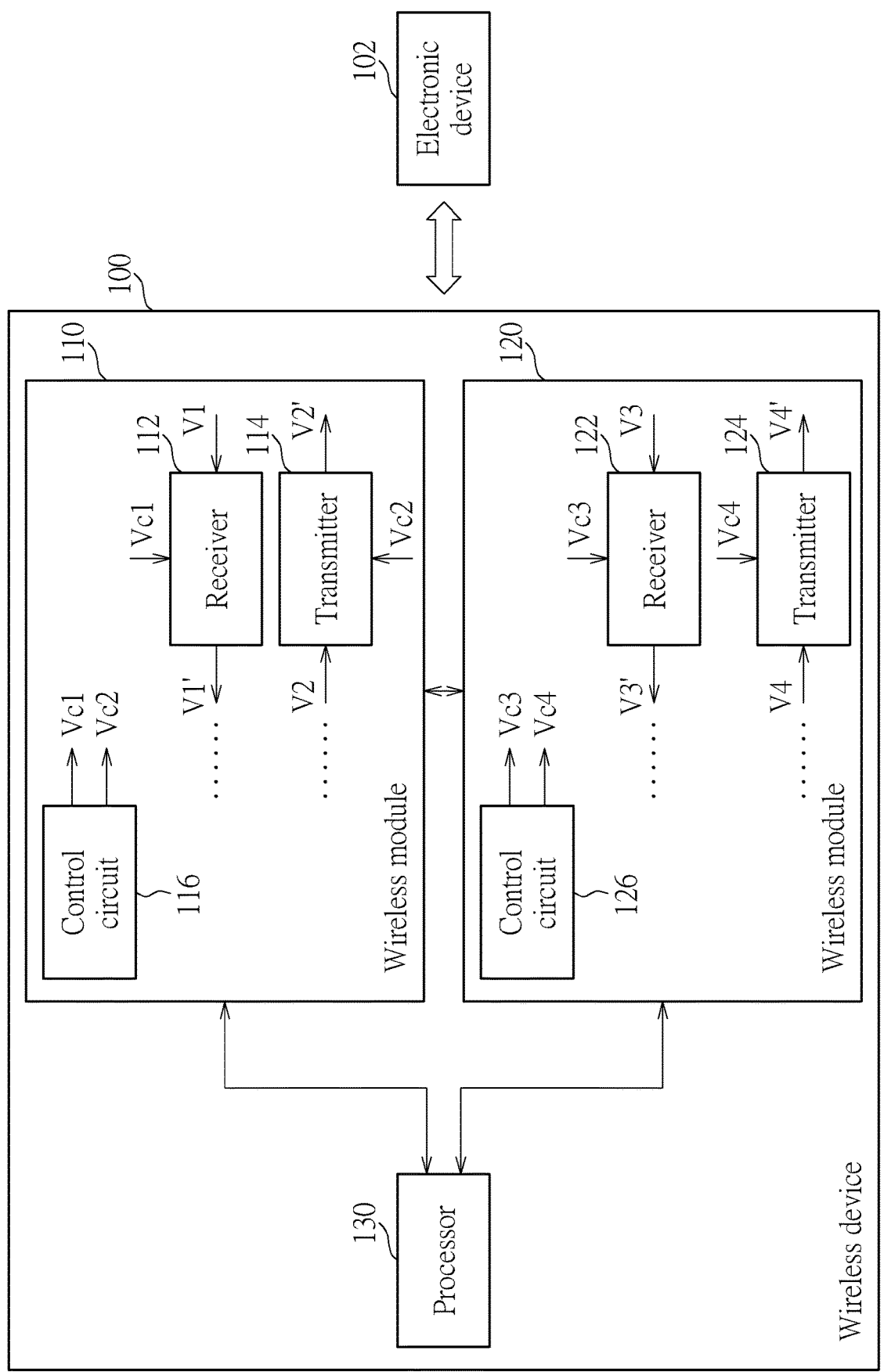
FIG. 1 is a diagram illustrating a wireless device according to one embodiment of the present invention.

FIG. 1 is a diagram illustrating a wireless device 100 according to one embodiment of the present invention. As shown in FIG. 1, the wireless device 100 comprises two wireless modules 110 and 120 and a processor 130, where the wireless module 110 comprises a receiver 112, a transmitter 114 and a control circuit 116, and the wireless module 120 comprises a receiver 122, a transmitter 124 and a control circuit 126. In this embodiment, the wireless device 100 can be any electronic device capable of wirelessly communicating with one or more electronic devices such as the electronic device 102, and the wireless modules 110 and 120 may be Wi-Fi module and BT module, respectively. In addition, the control circuits 116 and 126 can be implemented by hardware or software, that is the control circuits 116 and 126 may be implemented by using the processor to execute software code.

In the wireless module 110, the receiver 112 comprises at least one amplifier for amplifying a receiving signal V1 to generate an amplified receiving signal V1', and the amplified receiving signal V1' is transmitted to the processor 130 after being processed by other elements, wherein the gain of the receiver 112 (i.e. the gain of at least one amplifier within the receiver 112) is controlled by the control circuit 116. In addition, the transmitter 114 comprises at least one amplifier for amplifying a transmitting signal V2 from the processor 130 to generate an amplified transmitting signal V2', and the amplified transmitting signal V2' is broadcasted via an antenna of the wireless device 100, wherein the gain of the transmitter 114 (i.e. the gain of at least one amplifier within the transmitter 114) is controlled by the control circuit 116. Similarly, in the wireless module 120, the receiver 122 comprises at least one amplifier for amplifying a receiving signal V3 to generate an amplified receiving signal V3', and the amplified receiving signal V3' is transmitted to the processor 130 after being processed by other elements, wherein the gain of the receiver 122 (i.e. the gain of at least one amplifier within the receiver 122) is controlled by the control circuit 126. In addition, the transmitter 124 comprises at least one amplifier for amplifying a transmitting signal V4 from the processor 130 to generate an amplified transmitting signal V4', and the amplified transmitting signal V4' is broadcasted via an antenna of the wireless device 100, wherein the gain of the transmitter 124 (i.e. the gain of at least one amplifier within the transmitter 124) is controlled by the control circuit 126. Hereinafter, "TX power" of the wireless module 110/120 is used to indicate the power of the amplified transmitting signal V2'/V4', or the gain of the transmitter 114/124, or the gain of one or more amplifiers within the transmitter 114/124, or any other value capable of representing the strength/power/amplitude of the amplified transmitting signal V2'/V4'; and "RX gain" of the wireless module 110/120 is used to indicate the gain of the receiver 112/122, or the gain of one or more amplifiers within the receiver 112/122, or any other amplifying factor contributed by the receiver 112/122.

Figure 2:
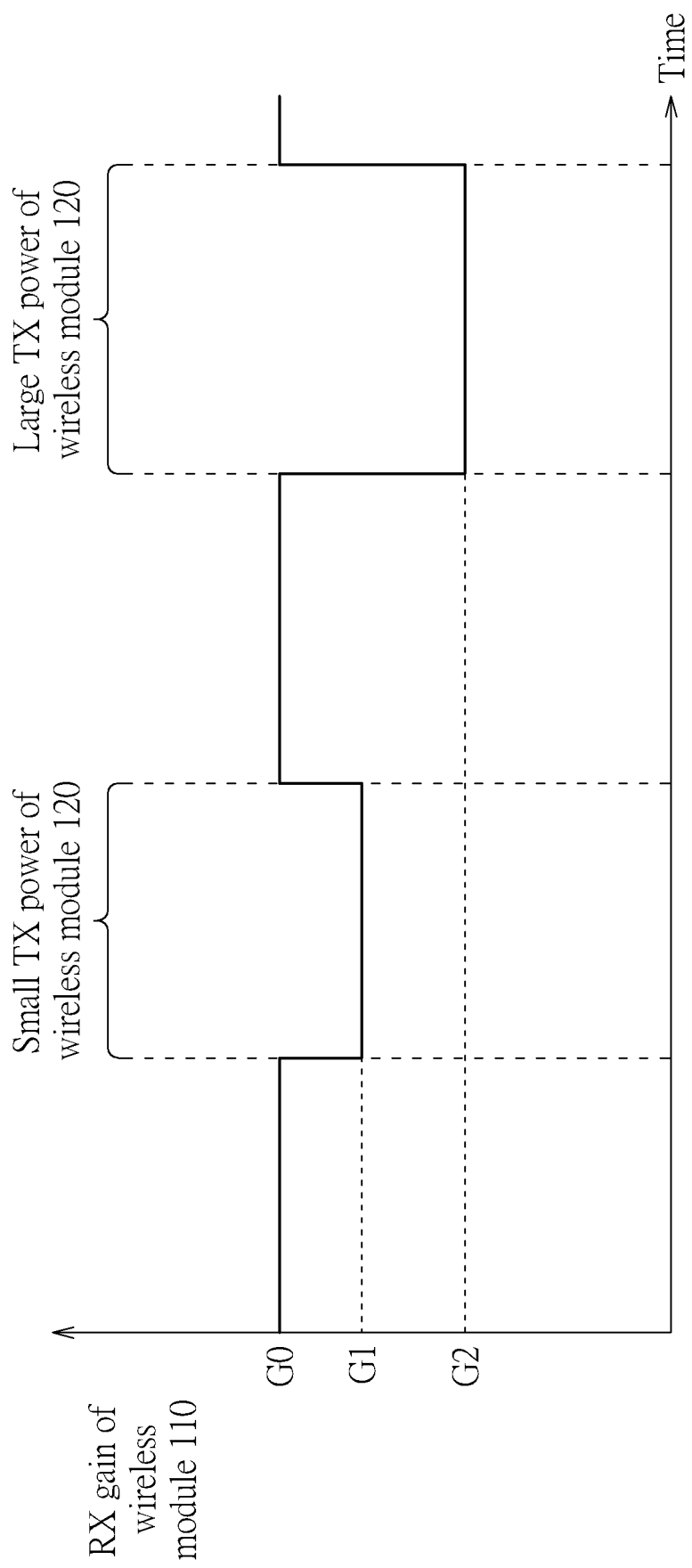
FIG. 2 is a diagram illustrating a RX gain control of the wireless module according to one embodiment of the present invention.

In the embodiment shown in FIG. 1, the wireless module 110 obtains the transmitter time information provided by the wireless module 120 in a real-time manner, wherein the transmitter time information of the wireless module 120 indicates that when the transmitter 124 of the wireless module 120 transmits the amplified transmitting signal V4'. After receiving the transmitter time information of the wireless module 120, the control circuit 116 refers to the transmitter time information of the wireless module 120 to determine an upper limit of the RX gain of the wireless module 110, so that the control circuit 116 generates the control signal Vc1 to control the RX gain of the wireless module 110 (i.e. the RX gain can be any suitable value lower than the upper limit). Specifically, the control circuit 116 can align the timing of the amplified transmitting signal V4' to determine the upper limit of the RX gain of the wireless module 110, that is the control circuit 116 can lower the upper limit of the RX gain when the transmitter 124 transmits the amplified transmitting signal V4' to mitigate the performance degradation, and the control circuit 116 does not limit the RX gain of the wireless module 110 or uses a predetermined upper limit of the RX gain when the transmitter 124 does not transmit the amplified transmitting signal V4' to maintain the sensitivity. In one embodiment, the upper limit of the RX gain of the wireless device 110 is determined lower if the wireless device 120 has higher TX power. Taking FIG. 2 as an example, if the wireless module 120 does not transmit any signal, the upper limit of the RX gain of the wireless module 110 is set to be a predetermined upper limit G0 or the control circuit 116 does not set the upper limit (e.g. the upper limit is released when it is detected that the wireless module 120 stops transmitting the transmitting signal); if the TX power of the wireless module 120 is small, the control circuit 116 determines the upper limit G1 of the RX gain of the wireless module 110; and if the TX power of the wireless module 120 is large, the control circuit 116 determines the lower upper limit G2 of the RX gain of the wireless module 110.

Figure 3:
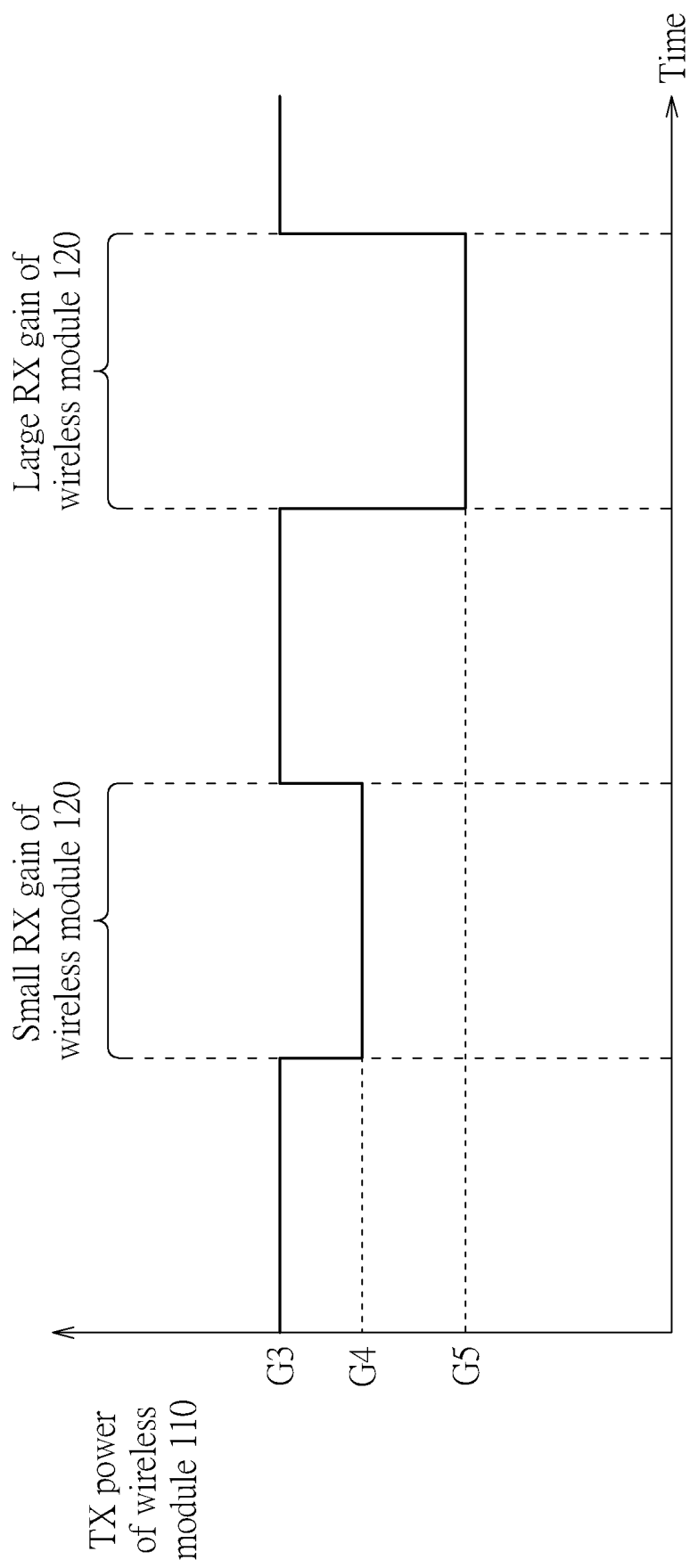
FIG. 3 is a diagram illustrating a TX power control of the wireless module according to one embodiment of the present invention.

In one embodiment, the wireless module 110 obtains receiver time information provided by the wireless module 120 in a real-time manner, wherein the receiver time information of the wireless module 120 indicates that when the receiver 122 of the wireless module 120 receives and processes the receiving signal V3. After receiving the receiver time information of the wireless module 120, the control circuit 116 refers to the receiver time information of the wireless module 120 to determine an upper limit of the TX power of the wireless module 110, so that the control circuit 116 generates the control signal Vc2 to control the TX power of the wireless module 110 (i.e. the TX power can be any suitable value lower than the upper limit). Specifically, the control circuit 116 can align the timing of the receiving signal V3 to determine the upper limit of the TX power of the wireless module 110, that is the control circuit 116 can lower the upper limit of the TX power when the receiver 122 receives and processes the receiving signal V3 to mitigate the performance degradation of the wireless module 120, and the control circuit 116 does not limit the TX power of the wireless module 120 or uses a predetermined upper limit of the TX power when the receiver 122 does not receive and process the receiving signal V3 to maintain the sensitivity of the wireless module 120. In one embodiment, the upper limit of the TX power of the wireless device 110 is determined lower if the wireless device 120 has higher RX gain. Taking FIG. 3 as an example, if the wireless module 120 does not receive and process any signal, the upper limit of the TX power of the wireless module 110 is set to be a predetermined upper limit G3 or the control circuit 126 does not set the upper limit; if the RX gain of the wireless module 120 is small, the control circuit 126 determines the upper limit G4 of the TX power of the wireless module 110; and if the RX gain of the wireless module 120 is large, the control circuit 126 determines the lower upper limit G5 of the TX power of the wireless module 110.

Regarding the wireless module 120, in one embodiment, the wireless module 120 obtains the transmitter time information provided by the wireless module 110 in a real-time manner, wherein the transmitter time information of the wireless module 110 indicates that when the transmitter 114 of the wireless module 110 transmits the amplified transmitting signal V2'. After receiving the transmitter time information of the wireless module 110, the control circuit 126 refers to the transmitter time information of the wireless module 110 to determine an upper limit of the RX gain of the wireless module 120, so that the control circuit 126 generates the control signal Vc3 to control the RX gain of the wireless module 120 (i.e. the RX gain can be any suitable value lower than the upper limit). Specifically, the control circuit 126 can align the timing of the amplified transmitting signal V2' to determine the upper limit of the RX gain of the wireless module 120, that is the control circuit 126 can lower the upper limit of the RX gain when the transmitter 114 transmits the amplified transmitting signal V2' to mitigate the performance degradation, and the control circuit 126 does not limit the RX gain of the wireless module 120 or uses a predetermined upper limit of the RX gain when the transmitter 114 does not transmit the amplified transmitting signal V2' to maintain the sensitivity. In one embodiment, the upper limit of the RX gain of the wireless device 120 is determined lower if the wireless device 110 has higher TX power, which is similar to the embodiment shown in FIG. 2.

In one embodiment, the wireless module 120 obtains receiver time information provided by the wireless module 110 in a real-time manner, wherein the receiver time information of the wireless module 110 indicates that when the receiver 112 of the wireless module 110 receives and processes the receiving signal V1. After receiving the receiver time information of the wireless module 110, the control circuit 126 refers to the receiver time information of the wireless module 110 to determine an upper limit of the TX power of the wireless module 120, so that the control circuit 126 generates the control signal Vc4 to control the TX power of the wireless module 120 (i.e. the TX power can be any suitable value lower than the upper limit). Specifically, the control circuit 126 can align the timing of the receiving signal V2 to determine the upper limit of the TX power of the wireless module 120, that is the control circuit 126 can lower the upper limit of the TX power when the receiver 112 receives and processes the receiving signal V2 to mitigate the performance degradation of the wireless module 120, and the control circuit 126 does not limit the TX power of the wireless module 120 or uses a predetermined upper limit of the TX power when the receiver 112 does not receive and process the receiving signal V2 to maintain the sensitivity of the wireless module 110. In one embodiment, the upper limit of the TX power of the wireless device 120 is determined lower if the wireless device 110 has higher RX gain, which is similar to the embodiment shown in FIG. 3.

In the embodiments mentioned above, by synchronizing the transmitter time information and the receiver time information to each other in a real time manner (i.e. per-packet control), the wireless module 110 and/or the wireless module 120 can determine the appropriate upper limit of the RX gain and/or the upper limit TX power at the appropriate time, to balance the efficiency of the receiver 112/122 and the transmitter 114/124.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a wireless device, wherein the wireless device comprises a first wireless module and a second wireless module, and the control method comprises:
   obtaining first transmitter time information that a transmitter of the first wireless module transmits a transmitting signal;
   referring to the first transmitter time information to determine an upper limit of a gain of a receiver of the second wireless module;
   obtaining receiver time information that a receiver of the first wireless module receives a receiving signal; and
   referring to the receiver time information to determine an upper limit of a power of a transmitting signal transmitted by a transmitter of the second wireless module;
   obtaining second transmitter time information that a transmitter of the second wireless module transmits a transmitting signal; and
   referring to the second transmitter time information to determine an upper limit of a gain of a receiver of the first wireless module;
   wherein the first wireless module is one of a Wi-Fi module and a Bluetooth module, and the second wireless module is the other one of the Wi-Fi module and the Bluetooth module.

2. The control method of claim 1, wherein the step of referring to the first transmitter time information to determine the upper limit of the gain of the receiver of the second wireless module comprises:
   referring to the first transmitter time information to lower the upper limit of the gain of the receiver of the second wireless module only when the transmitter of the first wireless module transmits the transmitting signal; and
   when the transmitter of the first wireless module does not transmit any transmitting signal, not limiting the gain of the receiver of the second wireless module, or using a predetermined upper limit of the gain of the receiver of the second wireless module.

3. The control method of claim 1, further comprising:
   obtaining a power of the transmitting signal transmitted by the transmitter of the first wireless module; and
   the step of referring to the first transmitter time information to determine the upper limit of the gain of the receiver of the second wireless module comprises:
   referring to the first transmitter time information and the power of the transmitting signal to determine the upper limit of the gain of the receiver of the second wireless module.

4. The control method of claim 3, wherein the step of referring to the first transmitter time information and the power of the transmitting signal to determine the upper limit of the gain of the receiver of the second wireless module comprises:
   if the power of the transmitting signal corresponds to a first level, determining a first upper limit for the gain of the receiver of the second wireless module; and
   if the power of the transmitting signal corresponds to a second level greater than the first level, determining a second upper limit for the gain of the receiver of the second wireless module, wherein the second upper limit is lower than the first upper limit.

5. The control method of claim 3, wherein the power of the transmitting signal is obtained in a real-time manner for determining the upper limit of the gain of the receiver of the second wireless module.

6. The control method of claim 1, wherein the step of referring to the receiver time information to determine the upper limit of the power of the transmitting signal transmitted by the transmitter of the second wireless module comprises:
   referring to the receiver time information to lower the upper limit of the power of the transmitting signal transmitted by transmitter of the second wireless module only when the receiver of the first wireless module receives the receiving signal; and
   when the receiver of the first wireless module does not receive any receiving signal, not lowering the upper limit of the power of the transmitting signal transmitted by transmitter of the second wireless module, or using a predetermined upper limit of the power of the transmitting signal.

7. The control method of claim 1, further comprising:
   obtaining a gain of the receiver of the first wireless module; and
   the step of referring to the receiver time information to determine the upper limit of the power of the transmitting signal transmitted by the transmitter of the second wireless module comprises:
   referring to the receiver time information and the gain of the receiver of the first wireless module to determine the upper limit of the power of the transmitting signal.

8. The control method of claim 7, wherein the step of referring to the receiver time information and the gain of the receiver of the first wireless module to determine the upper limit of the power of the transmitting signal comprises:
- if the gain of the receiver of the first wireless module corresponds a first value, determining a first upper limit of the power of the transmitting signal; and
- if the gain of the receiver of the first wireless module corresponds a second value greater than the first value, determining a second upper limit of the power of the transmitting signal.

9. The control method of claim 7, wherein the gain of the receiver of the first wireless module is obtained in a real-time manner for determining the upper limit of the power of the transmitting signal.

10. A control method of a wireless device, wherein the wireless device comprises a first wireless module and a second wireless module, and the control method comprises:
- obtaining first receiver time information that a receiver of the first wireless module receives a signal; and
- referring to the first receiver time information to determine an upper limit of a power of a transmitting signal transmitted by a transmitter of the second wireless module;
- obtaining second receiver time information that a receiver of the second wireless module receives a signal; and
- referring to the second receiver time information to determine an upper limit of a power of a transmitting signal transmitted by a transmitter of the first wireless module;
- wherein the first wireless module is one of a Wi-Fi module and a Bluetooth module, and the second wireless module is the other one of the Wi-Fi module and the Bluetooth module.

11. The control method of claim 10, wherein the step of referring to the first receiver time information to determine the upper limit of the power of the transmitting signal transmitted by the transmitter of the second wireless module comprises:
- referring to the first receiver time information to lower the upper limit of the power of the transmitting signal transmitted by transmitter of the second wireless module only when the receiver of the first wireless module receives the receiving signal; and
- when the receiver of the first wireless module does not receive any receiving signal, not lowering the upper limit of the power of the transmitting signal transmitted by transmitter of the second wireless module, or using a predetermined upper limit of the power of the transmitting signal.

12. The control method of claim 10, further comprising:
- obtaining a gain of the receiver of the first wireless module; and
- the step of referring to the first receiver time information to determine the upper limit of the power of the transmitting signal transmitted by the transmitter of the second wireless module comprises:
  - referring to the first receiver time information and the gain of the receiver of the first wireless module to determine the upper limit of the power of the transmitting signal.

13. The control method of claim 12, wherein the step of referring to the first receiver time information and the gain of the receiver of the first wireless module to determine the upper limit of the power of the transmitting signal comprises:
- if the gain of the receiver of the first wireless module corresponds a first value, determining a first upper limit of the power of the transmitting signal; and
- if the gain of the receiver of the first wireless module corresponds a second value greater than the first value, determining a second upper limit of the power of the transmitting signal.

14. The control method of claim 12, wherein the gain of the receiver of the first wireless module is obtained in a real-time manner for determining the upper limit of the power of the transmitting signal.

* * * * *